Aug. 4, 1953  B. H. LOCKE  2,647,787

BOTTLE HOLDER AND CARRIER

Filed Sept. 13, 1950

INVENTOR
Burton H. Locke

Patented Aug. 4, 1953

2,647,787

UNITED STATES PATENT OFFICE 2,647,787

BOTTLE HOLDER AND CARRIER

Burton H. Locke, Framingham, Mass.

Application September 13, 1950, Serial No. 184,539

4 Claims. (Cl. 294—87.28)

This invention relates to a device to facilitate the handling of milk bottles intermediate the delivery thereof to a home and the placing thereof into a refrigerator, or to other position in the home by the recipient.

The main object of the invention is to provide a device that is capable of being quickly suspended on or removed from the side wall of a house or on the outside of a door, or a like position, and of holding a plurality of bottles that may have different sizes of necks and is such that the bottles can be easily placed therein by a milkman, and having a means whereby the device, with the bottles intact, can be lifted from its suspended position and carried into the house in one hand while leaving the other hand free to manipulate the house doors, etc.

If the holder is suspended on the outside of a door the milk would be positioned between the door and a storm door, that may be afforded on the house, and in such instances the milk would be protected from the weather, and when the door is opened the carrier will swing inwardly on the door and the milk can be retrieved by a person without the person going outside. Obviously, such a procedure is very convenient and is most desirable in the winter time.

Another use of the holder and carrier to be set forth could be made by the milkman in that he could use the same for lifting bottles of milk from the conventional milk bottle case in his truck and then carry the bottles of milk by means of the carrier to the house and suspend the carrier, with the bottles of milk intact, onto the house support. After the following specification has been examined it will be apparent that the carrier could be quickly attached to the necks of a plurality of bottles in the case simultaneously by the carrier being tipped and slid down onto the necks of the standing bottles in the case. Then the carrier could be lifted vertically which would lift the bottles of milk from the case in proper position to be carried intact in the holder to the house. This procedure would eliminate the present method which requires the bottles of milk to be lifted individually from the case and then be placed into a conventional carrier for carriage to the house and then to be removed therefrom when being deposited at the house. Therefore, it is obvious that the device to be set forth and the use thereof is susceptible of eliminating considerable individual handling of milk bottles in the process of transporting the same from a milkman's truck to the recipient's refrigerator.

Another object is to afford suspension of the bottles above the usual position of standing on a porch floor, or on a step, so as to position the same out of the path and contact of animals and to position them where they will not be booted or otherwise knocked from the porch or step by children at play, or other persons in passing, and thereby eliminate possibilities of breakage and contamination from dirt and other encounters.

Another main object of the present invention is to afford a simple non-adjustable construction that will readily receive and securely hold bottles having various sizes of necks and thereby provide a device that is an improvement over that set forth in my application filed Jan. 24, 1950, Serial No. 140,307 which will only accommodate bottles having a predetermined size of neck.

There are milk bottles in present day use that have different sizes of necks which require devices that have different widths of slots to hold the same by the necks in the case of the construction set forth in my prior application.

In the present invention I conceive to dispose the slots on an incline and to construct the same with diverging sides so as to hold bottles having different sizes of necks by the bottles being slid into the slots until the necks thereof become wedged therein. The bottles are then retained in such position in the slots by the force of gravity and thus will not become inadvertently detached from the slots as the holder is lifted and carried.

For the main part, the object of the invention is to afford a novel means of handling a plurality of milk bottles from the delivery thereof outside a house, or from a delivery truck as set forth, to within the house which heretofore has been more or less of a laborious task due to the necessary requirement of opening doors, etc. Also, to afford a device that will accommodate bottles having different sizes of necks without the necessity of being provided with an adjustable feature to accomplish such accommodation.

Figure 1:
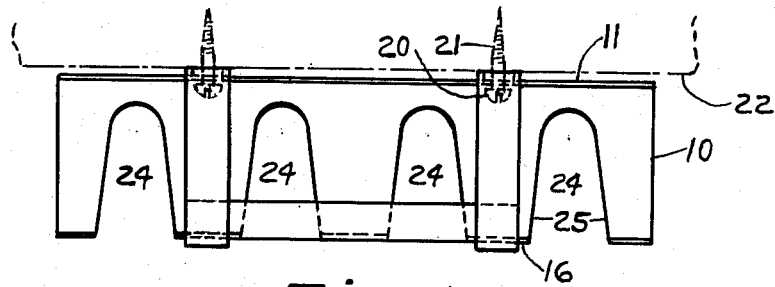
Figure 1, is a plan view of my improved milk bottle holder as it would appear suspended on a wall in position to receive bottles.
Figure 2:
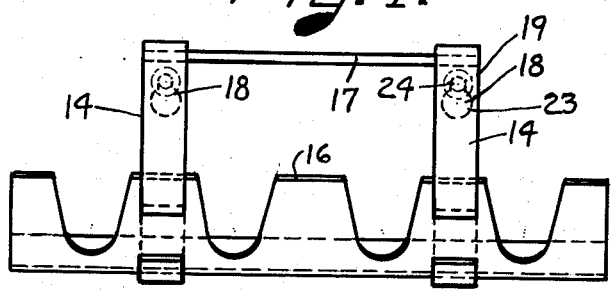
Figure 2, is a front elevation of the same.

My improved bottle holder and carrier comprises a substantially rectangular-shaped base plate 10 that is inclined upwardly and outwardly in respect to the back supporting surface 11, of the device. The base plate 10 is generally bent upwardly a relatively small amount at the back longitudinal edge 12 to form a back flange 13 which stiffens the plate structure and affords a portion to attach a plurality of relatively narrow vertically disposed suspending members 14, either by welding, riveting, or bolting, etc.

The vertical members 14 are secured in spaced relation onto the base plate 10 and extend upwardly a suitable amount to support the device against a house wall, or door, or the like. The upper portion 15, of members 14, is bent forward over the base plate 10 and then downwardly and then for a suitable distance underneath the front longitudinal edge 16, of base plate 10, to be secured thereto.

Figure 3:
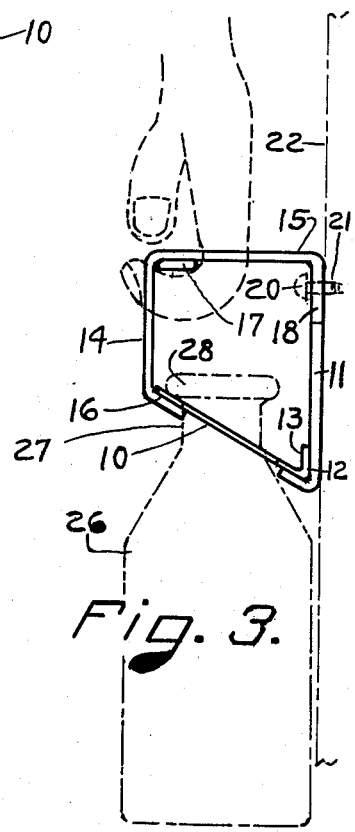
Figure 3 is an end elevation of the same and showing how the bottles are held therein and how the device is lifted and carried.

A bar member 17, bridging the vertical members 14 and secured thereto at the upper front portion thereof by welding, or riveting, or the like, serves as a handle whereby the holder can be lifted and carried, as shown in Figure 3. It will be noted that the handle 17 is positioned in front of above the center of gravity of the holder with its contents at any position in the slots, as indicative in Figure 3, so that the holder will tend to tip forward when lifted and thereby assure that the bottles will not inadvertently drop from the slots as could be the case if the handle was positioned rearwardly of above the center of gravity and the holder tipped backwardly due to the weight of the bottles.

There is an aperture 18 near the upper edge 19, of each vertical member 14, for the purpose of receiving the head 20 of a screw, or nail, 21 that may be secured in a house wall, or door, 22 against which the holder will rest when suspended on the said screws. The apertures 18 are enlarged, as at 23, to admit the heads 20, of screws 21, and are relatively narrow at the top 24 thereof to just receive the body portion of the screws when the holder is lowered after being placed over the said heads through the medium of the large open portion 23, of the apertures 18. Obviously, the holder can be removed from the screws only when it is lifted to permit the enlarged portion 23 of the apertures to pass over the heads of the screws.

Other means, such as hooks, or the like, could be provided on the vertical bar members for the purpose of providing a means to permit manual hanging of the holder onto a wall support as desired without departing from the main features of the invention.

There are a plurality of slots 24 extending inwardly from the upper front longitudinal edge 16, of base plate 10, and terminating within the said plate. The slots 24 have diverging sides 25 with the widest spread thereof at the longitudinal edge 16, of the plate 10, to afford means whereby bottles, such as shown at 26, may be tightly secured therebetween by the neck portion 27 thereof by being tipped and slid down the inclined base plate 10 with the large rim portion 28 of the bottle being above the said base plate. The neck portion 27 of the bottle will remain tightly secured within the slot by means of gravity which tends to cause the bottle to slide down to the narrowest permissible portion of the slot. The larger rim portion 28 of the bottle will thus be checked from passing through the slot and the holder can be lifted from its support and carried without danger of the bottles dropping from the slots.

Gravity will tend to cause the bottles to hang substantially vertically in the slots, as shown in Figure 3, although the necks on some bottles are of such shape as to cause the bottles to hang inclined somewhat away from the supporting surface 22. However, in any case the bottles will not drop from the slots and the holder can be lifted and carried in a comfortable carrying position without danger of the bottles dropping from the slots.

It is obvious that the slots 24 can be constructed to hold any of the milk bottles in present day use that have various sizes of necks and that the construction set forth is simple and would require no adjustment or maintenance to accommodate such bottles. Therefore, it is obvious that the construction set forth herein has an advantage over the construction set forth in the said prior invention.

Figure 4:
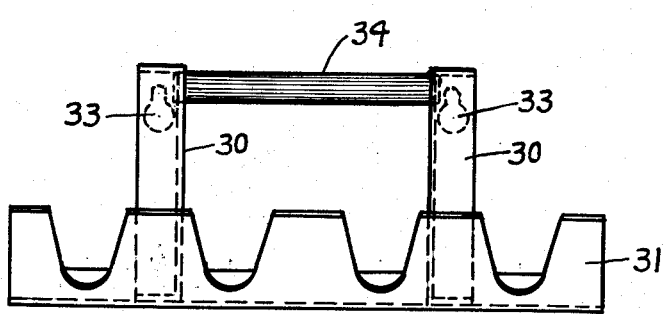
Figure 4, is a front elevation of a holder having a modified form of handle and supporting structure.
Figure 5:
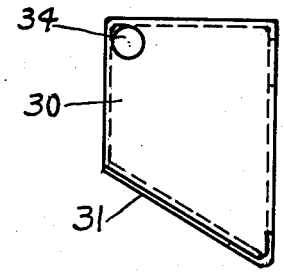
Figure 5, is an end elevation of the structure shown in Figure 4.

There are other ways that a handle supporting structure could be formed. One modified form of handle and handle support is shown by Figures 4 and 5 in that the vertical supporting members 30 are formed of sheet material and flanged on all sides to afford means of attaching to the base plate 31 and a portion in which the apertures 33 can be formed to receive the supporting screws. A round bar handle 34 is secured between the two vertical supporting members 30.

Therefore, I do not wish to be confined to the exact structure details set forth as the same are susceptible of modification within the spirit and scope of the invention.

I claim:

1. A holder and carrier for bottles that have a neck portion and a larger rim portion thereabove comprising a plurality of vertical structures having a vertical face with means to facilitate the holder being removably hung against a support, a base plate secured at the bottom of the said vertical structures, said base plate being disposed to incline outwardly and upwardly in respect to the said vertical face of the vertical structures, a plurality of slots having diverging sides extending in from the outer upper edge of the said base plate and terminating within the said plate, said slots being suitable to receive the neck portion of bottles and to check the passing of the said rim portion thereof therethrough when the necks of the bottles are tight within the slots, a bar handle connectingly attached to the vertical structures substantially near the top thereof and positioned substantially nearer above the open ends of the said slots than above the closed ends thereof when the holder is in its normal upright position.

2. A holder and carrier for bottles that have a neck portion and a larger rim portion thereabove comprising a plurality of vertical structures having a vertical disposed face with a slot therein to receive projections that may be provided on a vertical support for said holder so that the holder may be removably hung against the said support, a base plate secured at the bottom of the said vertical structures, said base plate being disposed to incline outwardly and upwardly in respect to the said vertical support, a plurality of slots having diverging sides extending in from the outer upper edge of the said base plate and terminating within the said plate, said slots being suitable to receive the neck portion of bottles and to check the passing of the said rim portion thereof therethrough when the necks of the bottles are tight within the slots, a bar handle connectingly attached to the vertical structures substantially near the top thereof and positioned substantially nearer above the open ends of the said slots than above the closed ends thereof when the holder is in its normal upright position.

3. A holder and carrier for bottles having a neck portion and a larger rim portion thereabove comprising a base plate disposed on an incline laterally, a plurality of upstanding members attached to said plate and disposed laterally thereon in spaced relationship longitudinally, one side of each of said members being substantially vertical and substantially in vertical alinement with the lowest disposed longitudinal edge of said base plate, an aperture in the form of an inverted key-slot near the top of the vertical side of each member to afford detachable hanging of the device against a support, a bar handle attached to and connecting the said upright members substantially at the top thereof, a plurality of slots extending in from the other longitudinal edge of said base plate and terminating in said plate, each said slot having its sides diverging toward each other from the open end thereof to the bottom thereof, said handle being positioned on said members substantially nearer above the open end of the said slots than above the closed end thereof when the holder is in its normal upright position.

4. A holder and carrier for bottles having a neck portion and a larger rim portion thereabove comprising a base plate disposed on an incline laterally, a plurality of upstanding members attached to said plate and disposed laterally thereon in spaced relationship longitudinally, one side of each of said members being substantially vertical and substantially in vertical alinement with the lowest disposed longitudinal edge of said base plate, means near the top of the vertical side of each member to afford detachable hanging of the device against a support, a bar handle attached to and connecting the said upright members substantially at the top thereof, a plurality of slots extending in from the other longitudinal edge of said base plate and terminating in said plate, each said slot having its sides diverging toward each other from the open end thereof to the bottom thereof, said handle being positioned on said members substantially nearer above the open end of the said slots than above the closed end thereof when the holder is in its normal upright position.

BURTON H. LOCKE.

References Cited in the file of this patent

UNITED STATES PATENTS

| Number | Name | Date |
| --- | --- | --- |
| 1,285,158 | Haynes | Nov. 19, 1918 |
| 2,067,124 | Hoffman | Jan. 5, 1937 |
| 2,264,903 | Kruea | Dec. 2, 1941 |
| 2,508,945 | Heuer | May 23, 1950 |
| 2,512,060 | Harris | June 20, 1950 |